United States Patent [19]

Pennewiss et al.

[11] Patent Number: 4,822,508

[45] Date of Patent: Apr. 18, 1989

[54] SHEAR STABLE MULTIRANGE OILS HAVING AN IMPROVED VISCOSITY INDEX

[75] Inventors: Horst Pennewiss, Darmstadt; Heinz Jost, Modautal; Helmut Knoell, Lautertal, all of Fed. Rep. of Germany

[73] Assignee: Röhm GmbH, Darmstadt, Fed. Rep. of Germany

[21] Appl. No.: 248,233

[22] Filed: Sep. 19, 1988

Related U.S. Application Data

[63] Continuation of Ser. No. 937,199, Dec. 2, 1986, abandoned.

[30] Foreign Application Priority Data

Dec. 13, 1985 [DE] Fed. Rep. of Germany ....... 3544061

[51] Int. Cl.$^4$ .................................... C10M 145/14
[52] U.S. Cl. ............................ 252/56 R; 252/51.5 R; 252/56 S
[58] Field of Search ........................ 252/56 R, 56 S

[56] References Cited

U.S. PATENT DOCUMENTS

| | | | |
|---|---|---|---|
| 2,091,627 | 8/1937 | Bruson | 252/57 |
| 2,100,993 | 11/1937 | Bruson | 260/2 |
| 2,114,233 | 4/1938 | Neher et al. | 260/2 |
| 2,655,479 | 10/1953 | Munday et al. | 252/56 |
| 3,067,163 | 12/1962 | Bauer | 252/51.5 A |
| 3,226,326 | 12/1965 | Lorensen et al. | 252/56 R |
| 3,238,133 | 3/1966 | Lorensen | 252/56 R |
| 3,598,736 | 8/1971 | Vandermeij et al. | 252/56 R |
| 3,607,749 | 9/1971 | Forbes | 252/56 R |
| 3,679,644 | 7/1972 | Vandermeij et al. | 252/56 R |
| 3,788,990 | 1/1974 | Elliott et al. | 252/56 R |
| 3,817,866 | 6/1974 | Yamanoto et al. | 252/56 R |
| 3,833,501 | 9/1974 | Elliott et al. | 252/56 R |
| 3,869,396 | 3/1975 | Vande Kraats et al. | 252/56 R |
| 3,951,929 | 4/1976 | Sweeney | 252/56 R |
| 4,073,738 | 2/1978 | Ladenberger et al. | 252/56 R |
| 4,149,984 | 4/1979 | Wenzel et al. | 252/56 R |
| 4,282,132 | 8/1981 | Benda et al. | 260/30.2 |
| 4,290,925 | 9/1981 | Pennewiss et al. | 252/56 R |
| 4,332,689 | 6/1982 | Tanisaki et al. | 252/49.3 |

FOREIGN PATENT DOCUMENTS 140274 5/1985 European Pat. Off. .
2258966 6/1973 Fed. Rep. of Germany .
1559952 1/1980 United Kingdom .

OTHER PUBLICATIONS

Olabisi et al., Polymer-Polymer Miscibility, Academic Press, New York 1979, p. 233.
Hughes et al., J. Applied Polymer Science, V, 15, 337–348 (1961).

*Primary Examiner*—William R. Dixon, Jr.
*Assistant Examiner*—Ellen M. McAvoy
*Attorney, Agent, or Firm*—Curtis, Morris & Safford

[57] ABSTRACT

Multirange lubricating oils having high shear stability comprising paraffinic oils as their base and containing, as an additive improving the viscosity index, a mixture of at least two different polymer species, each of said polymer species being composed of monomers selected from the group consisting of (a) esters of methacrylic acid and acrylic acid with linear alcohols having 6 to 15 carbon atoms,
(b) esters of methacrylic acid and acrylic acid with linear alcohols having from 16 to 30 carbon atoms,
(c) esters of methacrylic acid and acrylic acid with branched alcohols having from 6 to 40 carbon atoms,
(d) esters of methacrylic acid and acrylic acid with alcohols having from 1 to 5 carbon atoms, and
(e) other monomers, different from (a)-(d), susceptible to free-radical copolymerization, and containing functional groups in the molecule, monomer or monomers (a) being from 0 to 100 mole percent of said polymer species, monomer(s) (b) being from 0 to 10 mole percent, monomers (c), (d) and (e) combined being from 0 to 100 mole percent, and monomers (a) to (e) combined being 100 mole percent of said polymer species, said individual polymer species differing from one another by at least 10 mole percent with respect to their content of component (a).

3 Claims, No Drawings

SHEAR STABLE MULTIRANGE OILS HAVING AN IMPROVED VISCOSITY INDEX

This application is a continuation application of Ser. No. 937,199 filed Dec. 2, 1986 and now abandoned.

The present invention relates to multirange lubricating oils having high shear stability, and in particular gear oils, comprising paraffinic oils as their base, which lubricating oils contain from 3 to 60 percent by weight of an additive improving their viscosity index, said additive comprising esters of acrylic acid or of methacrylic acid.

THE PRIOR ART

The pronounced suitability of polyalkyl methacrylates for use as lubricating oil additives because of their effects of improving the viscosity index and depressing the pour point has long been commercially exploited. (Cf. Ullmanns Encyklopaedie der technischen Chemie, 4th ed., Vol. 20, pp. 545-547, Verlag Chemie.) European Pat. No. 140,274 teaches multifunctional additives for lubricating oils containing n-paraffins, which additives are mixtures of acrylate esters and methacrylate esters.

These mixtures consist of (I) 10 to 99 weight percent of polymers, $P_1$, which are composed of monomers selected from the group consisting of
  (a) esters of acrylic acid and methacrylic acid with linear alcohols having from 6 to 15 carbon atoms,
  (b) esters of acrylic acid and methacrylic acid with linear $C_{16}$-$C_{30}$ alcohols,
  (c) esters of acrylic acid and methacrylic acid with branched $C_8$-$C_{40}$ alcohols,
  (d) esters of acrylic acid and methacrylic acid with $C_1$-$C_5$ alcohols, and
  (e) other monomers, different from (a)-(d), having functional groups,
  component (b) representing not more than 5 mole percent of said polymer and (II) from 90 to 1 weight percent of polymers, $P_2$, which are composed of monomers selected from the group consisting of
  (a') esters of acrylic acid and methacrylic acid with linear $C_6$-$C_{15}$ alcohols,
  (b') esters of acrylic acid and methacrylic acid with linear $C_{16}$-$C_{30}$ alcohols,
  (c') esters of acrylic acid and methacrylic acid with branched $C_8$-$C_{40}$ alcohols,
  (d') esters of acrylic acid and methacrylic acid with $C_1$-$C_5$ alcohols, and
  (e') other monomers, different from (a')-(d'), having functional groups,
  component (b') representing from 10 to 70 mole percent of said polymers. Polymers $P_1$ and $P_2$ are dissolved in a solvent.

The additives of this European patent act not only as pour point improvers, but also influence the viscosity characteristics of the oils as a function of temperature, at both high and low temperatures. They were developed for the purpose of providing additives which bring the performance properties of the so called "critical base oils" (that is, lower quality base oils, dewaxed to a lesser degree), which have lately been appearing on the market, into line with practical requirements.

THE OBJECT OF THE INVENTION

However, these prior art additives cannot satisfy all practical requirements to the same degree.

The performance requirements which lubricating oils must meet are set forth in the customary specifications by classifications, for example SAE J 306 C for differential and transmission gears, or SAE J 300, April 1984 for internal combustion engines.

Multirange oils in the viscosity classifications SAE 75 W-90 for gear oils or 10 W-40 for engine oils, for example, can be used practically all year around. Their use permits less frequent oil changes, yet reduced friction losses. A special group of lubricating oils are the multirange lubricating oils having high shear resistance (high stability to shear), and particularly those used as gear oils. (Cf. Ullmanns Encyklopaedie der technischen Chemie, loc. cit., pp. 591-606.)

The requirements imposed by the specification 75 W-90 on highly shear stable multirange engine oils, which are based on paraffinic base oils, pose special problems for additives. These additives generally are up to 60 percent, and particularly from 10 to 30 percent, by weight of the paraffinic base oils. The need for VI-improving additives for such multirange lubricating oils having high shear stability, and particularly gear oils, has continued unabated.

THE INVENTION

It has now been found that multirange lubricating oils having high shear stability will satisfy the practical requirements for gear oils particularly well if they contain as additives a mixture of from 10 to 20 percent, and preferably from 12 to 18 percent, by weight of the multirange oils, of at least two different polymer species, P, each of these polymers species being composed of monomers selected from the group consisting of
  (a) esters of methacrylic acid and acrylic acid with linear alcohols having 6 to 15 carbon atoms,
  (b) esters of methacrylic acid and acrylic acid with linear alcohols having from 16 to 30 carbon atoms,
  (c) esters of methacrylic acid and acrylic acid with branched alcohols having from 6 to 40 carbon atoms,
  (d) esters of methacrylic acid and acrylic acid with alcohols having from 1 to 5 carbon atoms, and
  (e) other monomers, different from (a)-(d), which are susceptible to free radical copolymerization and which contain functional groups in the molecule.

Monomer or monomers (a) are from 0 to 100 mole percent of said polymers; monomer(s) (b) are from 0 to 10 mole percent, monomers (c), (d) and (e) combined are from 0 to 100 mole percent, and monomers (a) to (e) combined are 100 mole percent of each species, with the condition that the individual polymer species $P_1$, $P_2$, and possible further species, $P_n$, differ from one another by at least 10 mole percent with respect to their content of component (a). The effect of the mixtures of the polymer species $P_1$, $P_2$, and so forth according to the invention is superior to the effect of each of the components used by itself.

Preferably, monomer component (a) represents from 10 to 100 mole percent; component (b) from 0 to 5 mole percent, and more particularly from 2 to 4 mole percent; component (c) from 0 to 90 mole percent, and more particularly from 20 to 60 mole percent; component (d) from 0 to 50 mole percent, and more particularly from 5 to 30 mole percent; and component (e)

from 0 to 20 mole percent, and more particularly from 0 to 10 mole percent, of the individual polymer species $P_1$, $P_2$ and optional further species $P_3$, $P_4$, $P_5$, $P_n$.

With regard to the monomer components (a) of these polymers, it should be noted that esters of acrylic acid or methacrylic acid with linear $C_{10}$–$C_{14}$ alcohols, produced for example by the Ziegler process through hydrolysis of aluminum alkoxides, are preferred. These include, for example, certain of the alcohol products commercially available in various grades under the trademarks "Lorole" (Henkel AG, Duesseldorf) and "Alfole" (Condea, Hamburg).

The components (b) are preferably acrylate or methacrylate esters of linear $C_{16}$–$C_{24}$ alcohols, and more particularly $C_{16}$–$C_{20}$ alcohols. Examples are tallow fatty alcohols and alcohol grades sold under the "Alfole" mark.

The components (c) are preferably esters of acrylic acid or of methacrylic acid with branched $C_8$–$C_{20}$ alcohols of the isoalkanol type, and particularly with isodecyl, isotridecyl, and isooctadecyl alcohols.

The ester of acrylic acid or of methacrylic acid with "Dobanol 25L" (a product of Shell-Chemie), for example, should be used proportionately as both component (a) and component (c). The product, made by the Ziegler process referred to earlier, comprises $C_8$–$C_{40}$ alcohols which are predominantly linear but include a branched component.

Components (a), (b), (c), (d) and (e), in turn, may be grafted onto polyolefins or onto olefin copolymers (OCP).

The multirange lubricating oils of the invention having high shear stability may further contain from 0.05 to 1.0 percent, by weight of the multirange oils, of additives improving their pour point (see below).

The average molecular weights of the polymers P generally range from 20,000 to 100,000, as determined by gel permeation chromatography. The polymers $P_1$, $P_2$, etc. can be produced by polymerization of monomers (a) to (e) by the usual free radical initiated polymerization processes according to the desired composition.

Component (e) of the polymers P should be understood to mean, by definition, monomers susceptible of free radical polymerization and containing functional groups in the molecule, and more particularly those monomers which are known to have a positive dispersant and detergent action in oil additives. Nitrogen-containing monomers of this kind are particularly taught in U.S. Pat. No. 3,067,163 which is incorporated herein by reference. Illustrative of these are, for example, compounds of the formula

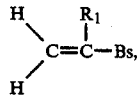

wherein $R_1$ is hydrogen or methyl and Bs is an inert heterocyclic five- or six-membered ring or

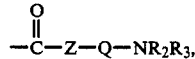

wherein Z is oxygen or a —$NR_4$ group. Q is a linear or branched aliphatic hydrocarbon bridge having from 2 to 10 carbon atoms, $R_2$ and $R_3$ taken alone are each alkyl having from 1 to 6 carbon atoms or, taken together with the nitrogen atom and inclusive of other possible hetero atoms, form a heterocyclic five- or six-membered ring, and $R_4$ is hydrogen or alkyl having from 1 to 6 carbon atoms.

Examples of such monomers are C-vinyl- and N-vinyl-pyridine, C- and N-vinylpyrrolidone, C- and N-vinylcarbazole and C- and N-vinylimidazole, as well as their alkyl derivatives, particularly the N-vinyl compounds, and moreover, the dialkylaminoalkyl esters of acrylic acid and of methacrylic acid, particularly dimethylaminoethyl acrylate and methacrylate and dimethylaminopropyl acrylate and methacrylate, as well as the corresponding amides (dialkylaminoalkyl acrylamides and methacrylamides), for example dimethylaminopropyl acrylamide and methacrylamide.

The multirange lubricating oils having high shear resistance

In keeping with the usual definitions, multirange lubricating oils having high shear resistance within the meaning of the present invention are multigrade gear oils, and in particular those of SAE classification 75 W-90. (Compare SAE J 306 C.) Further details on SAE classification will be found in DIN 51 511 and 51 512, for example.

The paraffinic base oils

Suitable paraffinic base oils are those having a viscosity from 3 to 8 $mm^2/sec$ at 100° C., and particularly mixtures of the fractions NS 100/NS 150. Such paraffinic base oils are known in the art and are discussed in Ullmanns Encyklopaedie der technischen Chemie, 4th ed., Vol. 20, pp. 487–503, or in Alphonse Schilling, "Motor Oils and Engine Lubrication", 2nd ed., 1968, pp. 2.2 to 2.21, for example.

Additives improving pour point

Additives improving the pour point which may be added to the multirange lubricating oils of the invention having high shear stability are, in particular, polyalkyl acrylates and methacrylates having $C_{12}$–$C_{18}$ alkyl groups, for example those marketed by Röhm GmbH under the marks "Viscoplex" 1-31, 1-33, and 1-35.

Production of the polymers $P_1$ and $P_2$

The polymers can be produced by prior art polymerization processes. (See Houben-Weyl, 4th ed., Vol. XIV.)

A mixture of mineral oil and of a monomer mixture composed as desired of (a), (b), (c), (d), and (e) is charged into a reaction vessel appropriately equipped with stirrer, thermometer, reflux condenser, and metering line. The charge is heated to about 90° C. to 100° C. under a carbon dioxide atmosphere and with stirring. After this temperature has been reached, and after addition of an initiator (preferably a peroxy compound such as a perester or peroxide, or an azo compound) and optionally of a chain transfer agent, e.g. a mercapto compound such as dodecyl mercaptan (Cf. Brandrup-Immergut, Polymer Handbook, 2nd ed., J. Wiley & Sons, 1975, and Houben-Weyl, loc. cit., Vol. XIV), a mixture of the monomers (a), (b), (c), (d) and (e) and more initiator and optional chain transfer agent is metered in. About 2 hours after completion of this addition, still more initiator and optional chain transfer agent are fed in. The total amount of initiator usually is from 0.5 to 3 percent, and the amount of chain transfer agent from 0.1 to 2.0 percent, both by weight of the total amount of monomers. The total polymerization time generally is between 8 and 9 hours. A viscous solution with a polymer content that usually ranges from 40 to 70 percent by weight is obtained.

Preparation of the polymer mixtures from the components $P_1$ and $P_2$ and optional further components The following procedure may be employed: One of the components is charged into a suitable container and heated to about 80° C. to 120° C. with stirring. The components to be admixed are likewise heated to about 80° C. to 120° C. and are added to the initially charged component as rapidly as possible with stirring.

Production of the multigrade lubricating oils

The additives improving the viscosity index is dissolved in the base oil together with any further additives, such as a detergent-inhibitor package, at 50° C. to 60° C. with stirring.

Such detergent-inhibitor packages ordinarily contain corrosion inhibitors, dispersants and/or detergents comprising (a) hydrophilic polar groups such as sulfonate, hydroxy, mercapto, carboxyl, or carbonamide groups, (2) hydrophobic (oleophilic) aliphatic, cycloaliphatic, or alkylaromatic hydrocarbon residues which impart oil solubility, and (3) one or more metal ions or amino groups. Exemplary dispersants/detergents include metal naphthenates and metal stearates and salts of alkylaryl sulfonic acids, phenoxides and phenoxide-sulfides, phosphates, thiophosphates, phosphonates, thiophosphonates, carbamates, thiocarbamates, compounds of polyisobutene and succinic acid, fumarates, etc.

The packages may also contain anti-wear agents or friction modifiers such as fatty acids or their esters, particularly with $C_{12}$-$C_{18}$ alcohols; fatty alcohols; N-acylated sarcosine; and sulfated natural fats; used alone or in combination with phosphonic acids.

Finally, the packages may also contain oxidation inhibitors such as sterically hindered phenols.

Use of the multirange lubricating oils having high shear stability

The multirange lubricating oils of the invention are used particularly as gear oils.

One of the advantages offered by the invention is that multigrade gear oils of SAE classification 75 W-90 can be produced comprising paraffinic mineral oils alone. Oil formulations in accordance with the invention have, in addition to the required viscosity data at 100° C., very good viscosity data over the range from −15° C. to −40° C.

For the characterization of these oils, the following measurements may be used:
Brookfield viscosity: (DIN 51 398/ASTM D 2183)
Capillary viscosity: (ASTM D 445)

A better understanding of the present invention and of its many advantages may be had by referring to the following Examples, given by way of illustration.

EXAMPLES

Preparation of oil additives

Additive A

The following mixture is charged into a two-liter four-necked flask equipped with stirrer, thermometer, reflux condenser, and metering line:

412.5 g of mineral oil ($\eta_{100° C.}$=3.9 mm$^2$/sec),
37.8 g of the methacrylic acid ester of a $C_{12}$-$C_{15}$ alcohol mixture comprising 60 percent by weight of branched alcohols,
1.1 g of the methacrylic acid ester of an n—$C_{16}$-$C_{18}$ alcohol mixture,
6.9 g of methyl methacrylate,
0.4 g of dodecyl mercaptan, and
0.4 g of tert-butyl peroctoate.

After the components are dissolved, the following mixture is metered in at 100° C. over a period of 210 minutes:

859.5 g of the methacrylic acid ester of a $C_{12}$-$C_{15}$ alcohol mixture comprising 60 percent by weight of branched alcohols,
26.0 g of the methacrylic acid ester of an n—$C_{16}$-$C_{18}$ alcohol mixture,
156.2 g of methyl methacrylate,
2.6 g of tert-butyl peroctoate, and
9.4 g of dodecyl mercaptan.

Two hours after completion of this addition, 2.2 g of tert-butyl peroctoate are fed in. Total polymerization time is 8 hours. A clear viscous solution is obtained.

Polymer content: 72.5 wt. %
Viscosity (100° C., 72.5 wt. %): 800 mm$^2$/sec
Viscosity (100° C., 7.25 wt. % in mineral oil of $\eta_{100° C.}$=5.4 mm$^2$/sec): 9.8 mm$^2$/sec SSI* (11.2 wt. % in mineral oil of $\eta_{40° C.}$=2.71 mm$^2$/sec): 8.0

*Shear Stability Index=loss in thickening effect in percent in the shear stability test in conformity with ASTM D 2603.

Additive B

Preparation and data as with Additive A, except:
Initial charge:
412.5 g of mineral oil ($\eta_{100° C.}$=3.9 mm$^2$ sec),
36.9 g of the methacrylic acid ester of a $C_{12}$-$C_{15}$ alcohol mixture comprising 23 percent by weight of branched alcohols,
0.9 g of the methacrylic acid ester of an n—$C_{16}$-$C_{18}$ alcohol mixture,
6.9 g of methyl methacrylate,
0.4 of dodecyl mercaptan, and
0.4 g of tert-butyl peroctoate.
Addition:
864.5 g of the methacrylic acid ester of a $C_{12}$-$C_{15}$ alcohol mixture comprising 23 percent by weight of branched alcohols,
21.0 g of the methacrylic acid ester of an n—$C_{16}$-$C_{18}$ alcohol mixture,
156.2 g of methyl methacrylate
2.6 g of tert-butyl peroctoate, and
9.4 g dodecyl mercaptan.

Additive C

Preparation as with Additive A, except:
Initial charge:
435 g of mineral oil ($\eta_{100° C.}$=3.9 mm$^2$/sec),
40.8 g of the methacrylic acid ester of a $C_{12}$-$C_{15}$ alcohol mixture comprising 60 percent by weight of branched alcohols,
7.2 g of methyl methacrylate,
0.53 g of dodecyl mercaptan, and
0.4 g of tert-butyl peroctoate.
Addition:
905.3 g of the methacrylic acid ester of a $C_{12}$-$C_{15}$ alcohol mixture comprising 60 percent by weight of branched alcohols,
159.7 g of methyl methacrylate,
11.7 g of dodecyl mercaptan, and
2.7 g ter-butyl peroctoate Polymer content: 71.0 wt. %
Viscosity (100° C., 71.0 wt. %): 460 mm²/sec
Viscosity (100° C., 7.1 wt. % in mineral oil of $\eta_{100°\ C.}=5.4$ mm²/sec): 8.5 mm² sec SSI (11 wt. % in mineral oil of $\eta_{40°\ C.}=2.71$ mm²/sec)=3.0

Additive D
Preparation and data as with Additive C, except:
Initial charge:
435 g of mineral oil $\eta_{100°\ C.}=3.9$ mm²/sec)
39.6 g of the methacrylic acid ester of a $C_{12}$–$C_{15}$ alcohol mixture comprising 23 percent by weight of branched alcohols,
1.2 g of the methacrylic acid ester of an n—$C_{16}$–$C_{18}$ alcohol mixture,
7.2 g of methyl methacrylate,
0.53 g of dodecyl mercaptan, and
0.4 g of tert-butyl peroctoate.
Addition:
878.7 g of the methacrylic acid ester of a $C_{12}$–$C_{15}$ alcohol mixture comprising 23 percent by weight of branched alcohols,
26.6 g of the methacrylic acid ester of an n—$C_{16}$–$C_{18}$ alcohol mixture,
159.7 g of methyl methacrylate,
11.7 g of dodecyl mercaptan, and
2.7 g of tert-butyl peroctoate.

Additive E
The following mixture is charged into a two-liter four-necked flask equipped with stirrer, thermometer, reflux condenser, and metering line:
412.5 g of mineral oil ($\eta_{100°\ C.}=3.9$ mm²/sec),
35.44 g of the methacrylic acid ester of a $C_{12}$–$C_{15}$ alcohol mixture comprising 60 percent by weight of branched alcohols,
1.04 g of the methacrylic acid ester of an n—$C_{16}$–$C_{18}$ alcohol mixture,
7.46 g of n-butyl methacrylate,
1.86 g of 2-dimethylamino ethyl methacrylate,
0.4 g of dodecyl mercaptan, and
0.4 g of tert-butyl peroctoate.

After the components are dissolved, the following mixture is metered in at 100° C. over a period of 210 minutes:
806.28 g of the methacrylic acid ester of a $C_{12}$–$C_{15}$ alcohol mixture comprising 60 percent by weight of branched alcohols,
23.54 g of the methacrylic acid ester of an n—$C_{1-6}$–$C_{18}$ alcohol mixture,
169.59 g of n-butyl methacrylate,
42.29 g of 2-dimethylamino ethyl methacrylate,
2.6 g of tert-butyl peroctoate, and
9.4 g of dodecyl mercaptan.

Two hours after completion of this addition, 2.2 g of tert-butyl peroctoate are fed in. Total polymerization time is 8 hours A clear viscous solution is obtained.
Polymer content: 72.5 wt. %
Viscosity (100° C., 72.5 wt. %): 800 mm²/sec
Viscosity (100° C., 7.25 wt. % in mineral oil of $\eta_{100°\ C.}=5.4$ mm²/sec): 9.8 mm²/sec SSI (11.2 wt. % in mineral oil of $\eta_{40°\ C.}=2.71$ mm²/sec): 8.0

Additive F
Preparation and data as with Additive A, except:
Initial charge:
412.5 g of mineral oil ($\eta_{100°\ C.}=3.9$ mm² sec),
34.56 g of the methacrylic acid ester of a $C_{12}$–$C_{15}$ alcohol mixture comprising 23 percent by weight of branched alcohols,
0.8 g of the methacrylic acid ester of an n—$C_{16}$–$C_{18}$ alcohol mixture,
7.51 g of n-butyl methacrylate,
1.83 g of 2-dimethylamino ethyl methacrylate
0.4 g of dodecyl mercaptan, and
0.4 g of tert-butyl peroctoate.
Addition:
805.24 g of the methacrylic acid ester of a $C_{12}$–$C_{15}$ alcohol mixture comprising 23 percent by weight of branched alcohols,
18.75 g of the methacrylic acid ester of an n—$C_{1-6}$–$C_{18}$ alcohol mixture,
175.0 g of n-butyl methacrylate,
42.71 g of 2-dimethylamino ethyl methacrylate
2.6 g of tert-butyl peroctoate, and
9.4 g dodecyl mercaptan.

TABLE 1

| | | | Comparative Examples | | |
|---|---|---|---|---|---|
| Comparative Example No. | Additive No. | Formulation 75W-90 | Viscosity in conformity with ASTM D 445 at 100° C. (mm²/sec) | Viscosity in conformity with ASTM D 2983 at −40° C. (mPa/sec) | SSI*** |
| 1 | A | I | 13.6 | Not measurable; solid | 8.0 |
| 2 | B | I | 13.6 | 312,000 | 8.0 |
| 3 | C | II | 13.6 | Not measurable; solid | 3.0 |
| 4 | D | II | 13.6 | Not measurable; solid | 3.0 |
| 5 | E | I | 13.6 | Not measurable; solid | 8.0 |
| 6 | F | I | 13.6 | 360,000 | 8.0 |

(I)  20 wt. % additive
    38.85 wt. % NS 100 oil
    34.45 wt. % NS 150 oil
    6.5 wt. % detergent-inhibitor package*
    0.2 wt. % pour-point improver**

(II) 25 wt. % additive
    36.2 wt. % NS 100 oil
    32.1 wt. % NS 150 oil
    6.5 wt. % detergent-inhibitor package*
    0.2 wt. % pour-point improver**

*"ANGLAMOL 99" (Lubrizol) comprising zinc dialkyldithiophosphate, polyisobutylsuccinimide, petroleum sulfate, and sterically hindered phenol.
**"VISCOPLEX 1-31" (Rohm) a solution of poly($C_{12}$–$C_{18}$)alkyl methacrylate in mineral oil of viscosity 5.3 mm²/sec at 100° C. measured in an Ubbelohde viscosimeter.
***Shear Stability Index = loss in thickening effect in percent in the

TABLE 1-continued shear stability test in conformity with ASTM D 2603.

TABLE 2

| Example No. | Additive mixture | Formulation 75W-90 | Examples Viscosity in conformity with ASTM D 445 at 100° C. (mm²/sec) | Viscosity in conformity with ASTM D 2983 at −40° C. (mPa/sec) | SSI*** |
|---|---|---|---|---|---|
| 1 | A/B = 1 | I | 13.6 | 120,000 | 8.0 |
| 2 | C/D = 0.4 | II | 13.6 | 140,000 | 3.0 |
| 3 | E/F = 1 | I | 13.6 | 135,000 | 8.0 |
| | | | Limit in conformity with SAE J 306 C | | |
| | | | Min. 13.5 Max. 24 | Max. 150.000 | |

(I) 20 wt. % additive
38.85 wt. % NS 100 oil
34.45 wt. % NS 150 oil
6.5 wt. % detergent-inhibitor package*
0.2 wt. % pour-point improver**

(II) 25 wt. % additive
36.2 wt. % NS 100 oil
32.1 wt. % NS 150 oil
6.5 wt. % detergent-inhibitor package*
0.2 wt. % pour-point improver**

*"ANGLAMOL 99" (Lubrizol) comprising zinc dialkyldithiophosphate, polyisobutylsuccinimide, petroleum sulfate, and sterically hindered phenol.
**"VISCOPLEX 1-31" (Rohm) a solution of poly($C_{12}$-$C_{18}$)alkyl methacrylate in mineral oil of viscosity 5.3 mm²/sec at 100° C. measured in an Ubbelohde viscosimeter.
***Shear Stability Index = loss in thickening effect in percent in the shear stability test in conformity with ASTM D 2603.

What is claimed is:

1. A multirange lubricating oil having high shear stability comprising 40–80 percent, by weight, paraffinic based oils and the balance being an additive improving the viscosity index, said additive being a mixture of from 10 to 20 percent each, by weight of said oil, of at least two different polymer species, each of said species comprising monomers selected from the group consisting of
   (a) esters of methacrylic acid and acrylic acid with linear alcohols having from 6 to 15 carbon atoms,
   (b) esters of methacrylic acid and acrylic acid with linear alcohols having from 16 to 30 carbon atoms,
   (c) esters of methacrylic acid and acrylic acid with branched alcohols having from 6 to 40 carbon atoms,
   (d) esters of methacrylic acid and acrylic acid with alcohols having from 1 to 5 carbon atoms, and
   (e) other monomers, different from (a)–(d), capable of free radical copolymerization and having the formula $H_2C=C(R_1)-B_s$, wherein $R_1$ is hydrogen or methyl and $B_s$ is an inert heterocyclic five- or six-membered ring or is $-C(O)-Z-Q-NR_2R_3$, wherein Z is oxygen or $-NR_4$, Q is a linear or branched aliphatic hydrocarbon bridge having from 2 to 10 carbon atoms, $R_2$ and $R_3$ taken alone are each alkyl having from 1 to 6 carbon atoms or, taken together with the nitrogen atom and inclusive of other possible hetero atoms, form a heterocyclic five- or six-membered ring, and $R_4$ is hydrogen or alkyl having from 1 to 6 carbon atoms.

2. A multirange lubricating oil as in claim 1 wherein said additive is a mixture of from 10 to 20 percent each, by weight of said oil, of two different polymer species.

3. A multirange lubricating oil as in claim 1 which additionally comprises from 0.05 to 1.0 percent, by weight of said lubricating oil, of an additive improving the pour point.

* * * * *